United States Patent [19]
Gross

[11] Patent Number: 5,333,157
[45] Date of Patent: Jul. 26, 1994

[54] EXPERT SYSTEM FOR IDENTIFICATION OF SIMULTANEOUS AND SEQUENTIAL REACTOR FUEL FAILURES WITH GAS TAGGING

[75] Inventor: Kenny C. Gross, Bolingbrook, Ill.

[73] Assignee: University of Chicago, Chicago, Ill.

[21] Appl. No.: 118,151

[22] Filed: Sep. 8, 1993

[51] Int. Cl.$^5$ .............................................. G21C 17/04
[52] U.S. Cl. ................................................... 376/251
[58] Field of Search ................ 376/251, 253, 450, 412, 376/413, 261, 216, 215

[56] References Cited

U.S. PATENT DOCUMENTS

| | | | |
|---|---|---|---|
| 3,959,069 | 5/1976 | McCormick | 376/251 |
| 4,495,143 | 1/1985 | Gross et al. | 376/251 |
| 4,764,335 | 8/1988 | Gross et al. | 376/253 |

*Primary Examiner*—Daniel D. Wasil
*Attorney, Agent, or Firm*—Emrich & Dithmar

[57] ABSTRACT

Failure of a fuel element in a nuclear reactor core is determined by a gas tagging failure detection system and method. Failures are catalogued and characterized after the event so that samples of the reactor's cover gas are taken at regular intervals and analyzed by mass spectroscopy. Employing a first set of systematic heuristic rules which are applied in a transformed node space allows the number of node combinations which must be processed within a barycentric algorithm to be substantially reduced. A second set of heuristic rules treats the tag nodes of the most recent one or two leakers as "background" gases, further reducing the number of trial node combinations. Lastly, a "fuzzy" set theory formalism minimizes experimental uncertainties in the identification of the most likely volumes of tag gases. This approach allows for the identification of virtually any number of sequential leaks and up to five simultaneous gas leaks from fuel elements.

7 Claims, 6 Drawing Sheets

$$H_i = \frac{|V_{M_2} \times V_{S_i}|}{|V_{S_i}|}$$

FIG. 4

FIG.9a
ORIGINAL NODE CONFIGURATION

FIG.9b
TRANSLATED NODE CONFIGURATION

TWO-DIMENSIONAL MEMBERSHIP CONTOURS.

FIG. 11b

MEMBERSHIP CONTOURS OVERLAP. CONCLUSION: ASSEMBLY A IS A FEASIBLE LEAKER SUSPECT. CONFIDENCE FACTOR = 90%

EXPERT SYSTEM FOR IDENTIFICATION OF SIMULTANEOUS AND SEQUENTIAL REACTOR FUEL FAILURES WITH GAS TAGGING

CONTRACTUAL ORIGIN OF THE INVENTION

The United States government has rights in this invention pursuant to Contract No. W-31-109-ENG-38 between the U.S. Department of Energy and the University of Chicago representing Argonne National Laboratory.

FIELD OF THE INVENTION

This invention relates generally to a system and method for diagnosing breached fuel elements in a nuclear reactor, and in particular to an expert system and method for identifying up to 5 simultaneous fuel failures and virtually any number of sequential fuel failures in a gas tagging system for the fuel elements in the core of a nuclear reactor.

BACKGROUND OF THE INVENTION

The typical nuclear reactor core includes a chain-reacting nuclear fuel material such as $U^{235}$ or $U^{238}$ or $Pu^{239}$ in the form of pellets encased in separate corrosion resistant heat conductive cans or cladding to form an elongated fuel element referred to as a fuel rod or fuel pin. A number of such fuel elements are grouped together in a pre-arranged spaced matrix within the core of the reactor, with moderators or another form of control means located in a different pre-arranged matrix within the core. The controlled presence of the fuel elements and control means regulate the extent of the nuclear reaction in which neutron bombardment and fission of heavy atoms provides for thermal heating of the fuel elements and surrounding core structures. A reactor coolant is circulated through the core and fuel assemblies and over the fuel elements so as to cool them. Electricity is generated by expansion of the heated coolant using suitable steam expansion equipment.

The fuel element cladding is typically of stainless steel or a zirconium alloy which maintains the fuel material sealed and isolated from the coolant. Failure of the cladding, such as by cracking or localized melting, may result in the release of radioactive fission products which contaminate the circulating coolant and present an operating and safety hazard. It is desirable to identify and locate a leaking fuel element as soon as possible so that the situation can be appraised and fuel replacement procedures quickly initiated with minimal cost and reactor down time.

Gas tagging is a common approach for identifying and locating a leaking fuel element in a nuclear reactor core. In a gas tagging failure detection system, stable isotopes of a gas in proportioned percentages of concentration to one another are sealed within different fuel elements as they are manufactured. The different fuel elements with their unique gas tags are then catalogued according to a prearranged matrix within the core. Upon a breach of a fuel element cladding, the unique "tag gas" mixture escapes to the reactor coolant system. Mass spectrometric analysis of gas samples from the reactor coolant system provides a weighted presence of the isotopes for identifying the unique "tag gas". The corresponding fuel assembly "leaker" may then be identified according to the reactor core's matrix catalog. Examples of this gas tagging approach for diagnosing breached fuel elements can be found in U.S. Pat. Nos. 4,495,143 and 4,764,335.

One of the early difficulties encountered with this gas tagging technique for identifying failed fuel assemblies involved the resolution of multiple, simultaneous failures. A prior art approach developed by the present inventor is described in an article entitled "Barycentric-Coordinates Technique for Identification of Simultaneous Fuel Failures with Gas Tagging," by Kenny C. Gross and Chris Passerello, *Nuclear Science and Engineering:* 75, 1-11 (1980). This barycentric-coordinates technique (BCT) is capable of resolving simultaneous fuel failures for a relatively small system of gas tags such as, for example, in the Experimental Breeder Reactor-II (EBR-II) with less than 80 unique tags. However, as the number of unique tags in the gas tagging system increases, the number of tag combinations to be searched with the BCT increases exponentially, so that a multi-million dollar supercomputer is required to perform light water reactor (LWR) tagging calculations with more than 750 unique tags.

The present invention addresses the aforementioned limitations of the prior art by providing an expert system and method for identification of simultaneous and sequential fuel failures with gas tagging for use with up to 800 unique gas tags with as many as five simultaneous fuel element failures.

OBJECTS AND SUMMARY OF THE INVENTION

Accordingly, it is an object of the present invention to detect and determine the identity and number of breached fuel elements in a nuclear reactor.

Yet another object of the present invention is to detect and analyze a breached fuel element in a nuclear reactor using the reactor's most recent fuel element breach history and an approximate, or "fuzzy", set theory formalism where there is a large number of fuel elements potentially in a breached condition.

A further object of the present invention is to provide a heuristic, rule-based methodology that substantially reduces the search space required for the identification of multiple, simultaneous fuel element failures in the core of a nuclear reactor.

A still further object of the present invention is to provide an improved method for the identification of simultaneous and sequential reactor fuel failures with gas tagging for use either with an inert cover gas such as in a liquid metal cooled reactor or without an inert cover gas such as in a commercial water cooled reactor.

These objects of the present invention are achieved and the disadvantages of the prior art are eliminated in a nuclear reactor having a plurality of fuel elements each including an inner fuel rod and an outer cladding disposed about and enclosing the fuel rod in a sealed manner, wherein each fuel element further includes a unique tag gas to assist in detection of a leak from a failed fuel element, by an inventive method for identifying a fuel element failure comprising the steps of: determining the composition in terms of one or more tag gases of a leaked gas from one or more of the fuel elements and assigning the composition of the leaked gas a tag node M in a first coordinate system; translating the tag node M to a second coordinate system wherein the tag node M is at the origin of the second coordinate system; generating a plurality of geometric node figures by identifying possible combinations of tag gases, wherein each corner of each of the geometric node figures represents a tag gas from a possible leaking fuel element and wherein the area or volume within all of the geometric figures represents all possible combinations of tag gases from leaking fuel elements; selecting only those tag gases within node figures encompassing the origin of the second coordinate system as from possibly leaking fuel elements; comparing the node figures encompassing the origin of the second coordinate system with a predetermined number of most recently leaking fuel elements; selecting only those node figures containing the most recently leaking fuel elements; and defining the selected node figures in terms of a membership contour ranging from 0 to 1, wherein 0 represents 0 probability of a gas tag and 1 represents 100% probability of a gas tag; and comparing the membership contours of each of the selected node figures with the tag node M for identifying a failed fuel element while compensating for measurement and tag gas composition uncertainties.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
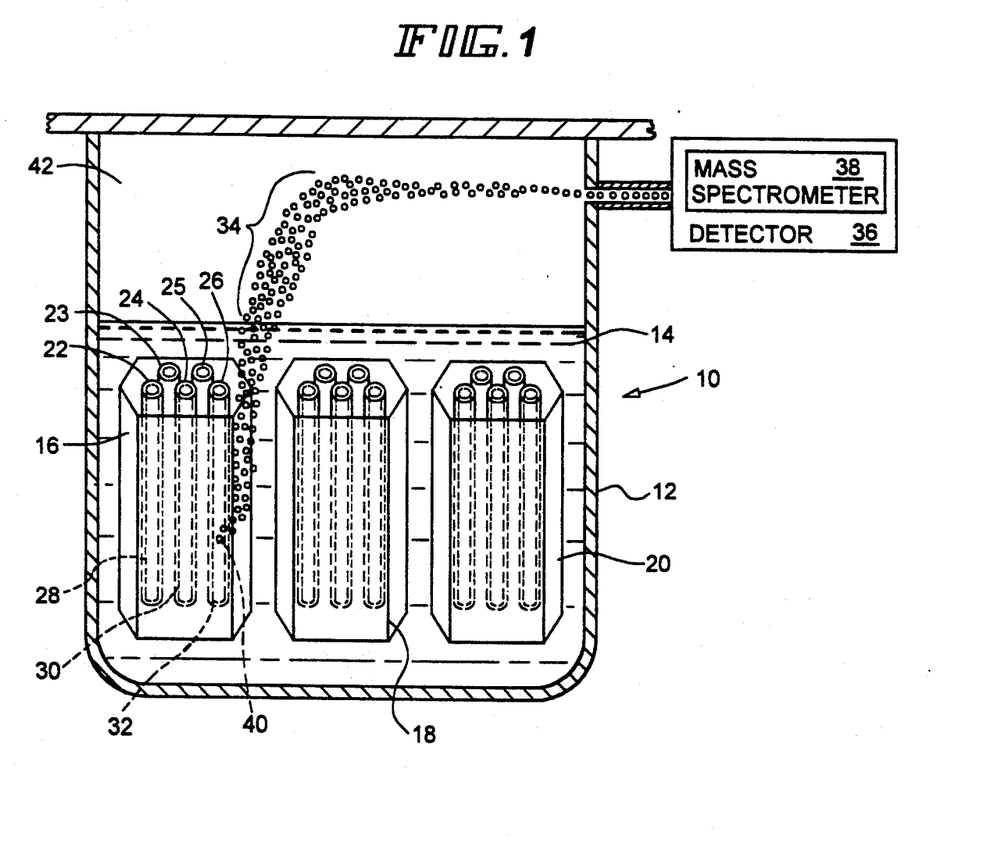
FIG. 1 is a simplified schematic diagram of a nuclear power system including a reactor containment vessel containing a plurality of fuel assemblies, one of which is shown as including a leaking fuel element.

Referring to FIG. 1, there is shown a simplified schematic diagram of a nuclear power system including a reactor 10. Reactor 10 includes a containment vessel 12 within which a core, comprised of a plurality of fuel assemblies 16, 18 and 20, is located. The entire vessel 12 confines a coolant 14 which is typically liquid sodium or water. Each of the fuel assemblies 16, 18 and 20 includes a plurality of cylindrical fuel rods arranged in a matrix array within the assembly. Thus, as shown for the first fuel assembly 16, a plurality of fuel rods 22–26 are arranged in a spaced, aligned manner within the fuel assembly. Each of the three fuel assemblies 16, 18 and 20 includes an outer cladding disposed about lateral and bottom portions of each of the fuel rods within the fuel assembly. The upper part of each of the fuel assemblies 16, 18 and 20 is open to provide access to the fuel rods disposed therein.

The reactor coolant 14 is circulated through the reactor's vessel 12 and over the fuel assemblies 16, 18 and 20 so as to cool them. The fuel assemblies 6, 18 and 20 are located in a prearranged spaced matrix within the reactor's containment vessel 12, with moderators or other form of control means (not shown in the figure for simplicity) being located in a different prearranged matrix within the reactor's containment vessel.

As shown for three of the fuel rods 22, 24 and 26 in the first fuel assembly 16, each of the fuel rods includes a respective cylindrical fuel element 28, 30 and 32 (shown in dotted-line form). Each of the fuel rods is sealed so that the fuel element therein is isolated from the coolant 14. Disposed in each of the sealed fuel rods is a gas tag comprised of stable isotopes of a gas isolated in proportioned percentages of concentration relative to the other tag gases for establishing unique combinations of the isotopes. The various fuel elements with their unique gas tags are catalogued according to the matrix array of fuel elements in the reactor's containment vessel 12. Although only three fuel assemblies 16, 18 and 20 are shown in the reactor's containment vessel 12 and only five fuel rods are shown in each fuel element, the present invention is adapted for use with a large number of fuel assemblies each containing a large number of fuel rods such as encountered in current light water reactors (LWRs).

As shown in the figure, fuel rod 26 in the first fuel assembly 16 contains an opening, or leak site, 40. When fission gas 34 is released from a breached cladding to the flowing coolant 14 within containment vessel 12, the turbulent mixing with the coolant breaks down the fission gas bubbles to sizes small enough that their transport is similar to that of atoms. Fission gas 34 migrates upward through the layers of coolant 14 and enters the cover gas 42. A detector 36 within the containment vessel 12 is then used to detect the escaped tag gas. Detector 36 typically includes a mass spectrometer 38.

The following discussion briefly summarizes a prior art barycentric-coordinates technique (BCT) for the identification of simultaneous fuel failures by means of gas tagging. This discussion is provided to lay a basis for the description of the present invention which follows and to point out differences between the present invention and the prior art. The term "simultaneous," as used herein, refers to any failure that occurs while more than a negligible quantity of tag gas remains in the coolant system from one or more previous leakers.

Figure 2:
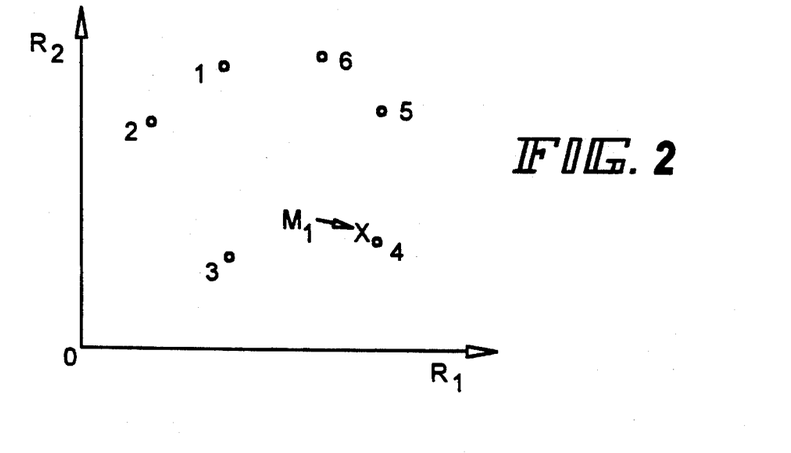
FIG. 2 is a graphic representation of a system of six tag nodes in a $R_1$–$R_2$ coordinate plane where isotopic ratios of a measured tag sample lie at a point $M_1$ and identification of a single leaker involves determination of which assembly's node lies closest to $M_1$ in the two-dimensional ratio plane.

Consider a system of six tag nodes whose characteristic tag ratios are plotted on the two-dimensional ratio plane as shown in FIG. 2. It is assumed that the tag compositions have been corrected for the effects of neutron burnup. Suppose that a leak is detected and the composition of the released gas is point $M_1$ in the figure. The procedure for determining which of the six assemblies is most likely to contain the leaker consists simply of computing the vector distance from point $M_1$ to each of the six tag nodes. In the absence of any other information, the prime suspect is the one with the shortest vector. If additional "probability of failure" information is available (e.g., from fuel burnup considerations, delayed neutron signals, etc.), then this information can be combined with the results from the vector calculations to provide an improved ranking of the leaker suspects. How-ever, since this work is concerned only with the information that can be extracted from the tag analyses, it will be assumed here that quantitative a priori failure probabilities for each assembly are not available; accordingly, each assembly will be considered equally likely to have failed. In this case, it can be seen immediately that, for the elementary example shown, assembly 4 is the one most likely to contain the leaker.

Figure 3:
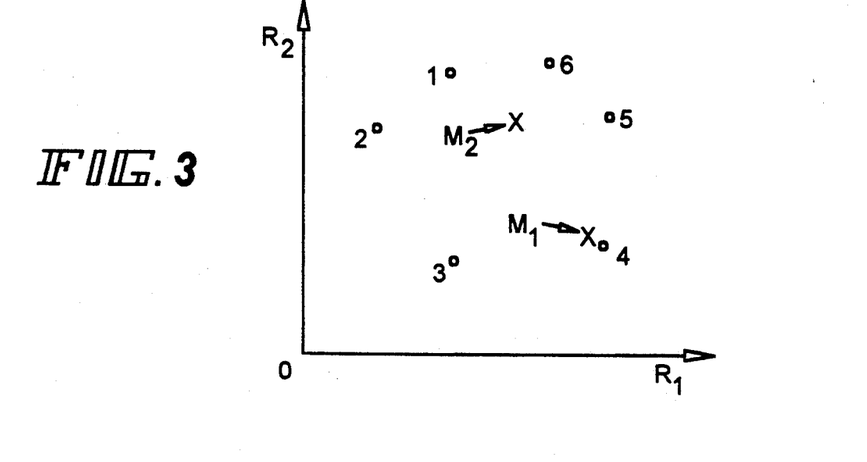
FIG. 3 is a graphic representation of the isotopic ratios of a second measured sample at point $M_2$, where the node $M_2$ is displaced from the first measured node $M_1$, indicating the occurrence of a second defect.

Suppose now that a second gas sample, $M_2$, is taken soon after $M_1$. If the position of the second measured node, $M_2$, is displaced from node $M_1$ (after appropriate allowances have been made for experimental uncertainties), then it has to be assumed that a second defect has occurred. FIG. 3 depicts a possible position of node $M_2$.

Figure 4:
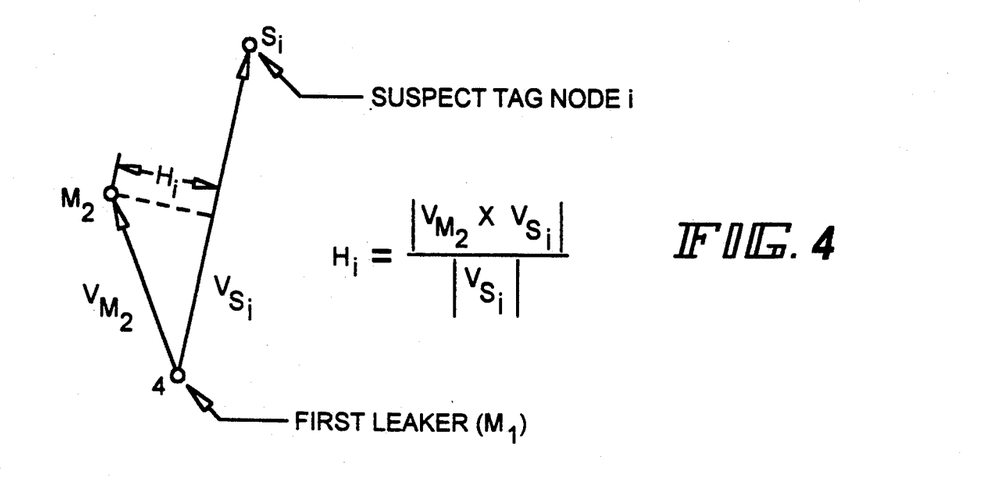
FIG. 4 is a graphic representation that the suspect most likely to contain the second leaker is the one producing a vector passing nearest the measured node $M_2$, as determined by the magnitude of the perpendicular distance $H_i$.

The second leaker is identified by forming $N-1$ vectors from node 4 (the first leaker) to each of the remaining suspect nodes, where N is the total number of tags in the system A vector is then drawn from node 4 to $M_2$ and elementary vector manipulations are used to compute the perpendicular distance, H, from node $M_2$ to each of the suspect vectors (see FIG. 4). The suspect producing the smallest value of H is the one considered most likely to contain the second leaker. For the system of nodes in FIG. 3, this procedure would indicate that assembly 1 contains the second leaker.

Note that the procedure just outlined is based on the experimentally verifiable principle that the node representing the mixture of two tags lies on the tie-line connecting their two tag nodes. This assumes that certain precautions have been taken when specifying the isotope to be used in the demonstration of each characteristic tag ratio. (Otherwise, identification of double, triple and higher order failures would not be analytically tractable).

If a third gas sample, $M_3$, were analyzed and found not to fall on the tie-line connecting nodes 4 and 1, the analysis would then be extended to search for a third leaker. In this case, $N-2$ triangles are formed using line segment 4-1 as the base and the remaining suspects (i.e., nodes 2, 3, 5 and 6 in our example) as vertices (see FIG. 5). Vector techniques are again used to determine which of the four suspect triangles contains $M_3$. The triangles containing point $M_3$ are considered possible suspects, and parameters are computed to determine the relative amounts of gas escaping from each leaker. Suspects producing triangles that do not contain $M_3$ are eliminated from further consideration.

Figure 5:
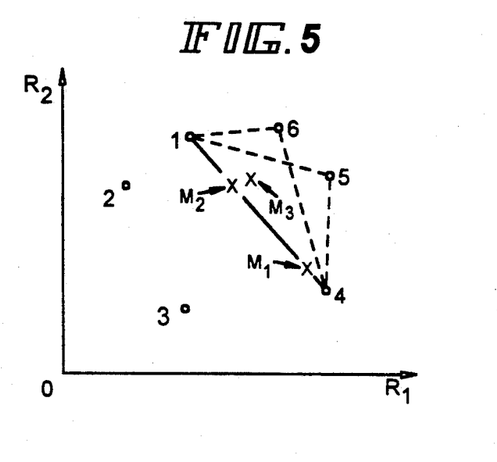
FIG. 5 is a graphic representation showing that a new measured node $M_3$ does not fall on the line connecting the first two leakers, but rather lies inside suspect triangles 145 and 146, indicating that assemblies 5 and 6 are possible sources of the new tag release.

The situation depicted in FIG. 5 illustrates one of the limitations of a two-dimensional tag system—that more than one triangle may contain the measured node (i.e., triangles 146 and 145 both contain $M_3$). Under these circumstances and without additional information, there would be nothing more our tag analyses could tell us. Thus, for our example, we would know that assemblies 2 and 3 are not leaking, that assemblies 4 and 1 contain the first two leakers, and that there is a third defect that is equally likely to have occurred in assembly 5 or 6.

Early efforts to alleviate this problem of degenerate identification led to three-ratio designs in which the system of tags was plotted in a three-dimensional Cartesian space. In a three-dimensional system, the same vector techniques described above are currently used to identify a new leaker in the presence of two, one, or no previously identified leakers. The degenerate-identification problem is still a possibility, but the likelihood of this situation arising is diminished because, for a given system of tags, the number of nodes that happen to be coplanar with the first two leakers and the point $M_3$ is reduced considerably. Locating the system of tags on curved surfaces can further reduce the likelihood of this problem.

In three dimensions, one can, in principle, extend the identification techniques to locate a fourth leaker, once the previous three have been identified. In this case, the procedure is to form $N-3$ tetrahedra by using the first three tag nodes as the common base and each of the remaining tag nodes in the system as the fourth vertex. Vector techniques are again used to determine which of the suspect tetrahedra enclose the fourth measured node, $M_4$.

The techniques described above have been used successfully in the Experimental Breeder Reactor-II (EBR-II) to identify new leakers in the presence of up to two background tags in a core of 50 to 55 tagged assemblies. However, these methods suffer from two limitations that may severely restrict their usefulness in resolving simultaneous failures in reactors with larger cores, such as light water reactors or large fast reactors, or in reactors operating in the "run beyond failure" mode.

The first limitation is the requirement that one must know the composition of the tags from the previous N leakers before it is possible to analyze for the $(N+1)$'th leaker. Thus, if a second failure were to occur before a gas sample could be obtained with which to identify the first leaker, the methods described above would be of little value. The second limitation is that the vector techniques used in early analysis schemes are computationally inefficient and awkward to program.

To overcome the first limitation, one could, in principle, develop a procedure using the vector techniques to systematically check all possible double-failure combinations. This could be accomplished by assuming, for example, that node 1 is the first leaker and checking, as described above, the remaining $N-1$ nodes for possible second leakers. The procedure could then be repeated by assuming node 2 to be the first leaker and checking it with the remaining N−2 nodes, and so on. Combinations producing straight lines passing nearest to the measured node would then be ranked as the most likely suspects.

Such a procedure was advanced by Omberg and Schenter and used as an aid in selecting node positions for the Fast Flux Test Facility tags in *Trans. Am. Nucl. Soc.*, 16, 215 (1973). This procedure would not be feasible for routine leaker analyses, however, because of the second limitation mentioned—the inefficiency of the analytical methods.

A leaker analysis for a core of 50 tags in EBR-II requires 2 to 3 seconds of computer time on an IBM-3033, depending on whether the search is for the first, second, third or fourth leaker. Basically, each of these analyses requires 51−NL vector calculations (where NL is the number of leakers involved), followed by a simple sorting procedure. However, if the first leaker were not known, the number of vector calculations required to identify two simultaneous leakers would jump to 1225. If the systematic procedure were extended to search for three simultaneous leakers without knowing the identity of the first two, the number of triangle calculations required would be 19 600. To search for four simultaneous leakers without knowing the identity of any of the first three leakers would require $2.3 \times 10^5$ tetrahedron calculations. For larger systems of tags the computational effort increases with the binomial coefficient N!/(N−NL)!NL! where N is the number of distinct tags in the system and NL=1, 2, 3 or 4, depending on the number of leakers involved. Of course, NL may also be unknown, in which case all four procedures would have to be applied and the results compared to determine the most likely mode of failure. A rough calculation reveals that even for the relatively modest number of tags in EBR-II, a program to check for all possible combinations of simultaneous failures with the foregoing vector approach would require>two hours of central processing unit time per run on an IBM-3033.

The barycentric-coordinates technique (BCT) represents a prior art improvement by providing a highly efficient algebraic procedure that produces results identical to those from the essentially geometric approach described above, but in a fraction of the computing time. This technique utilizes procedures from finite element mathematics to express the tag-node coordinates in the form of linear weighting functions using a system of what are known in topology as barycentric coordinates. The BCT approach will first be applied to a two-dimensional tag system to show how it can be used to identify up to three simultaneous leakers without requiring previous knowledge of any of the tag compositions. The technique will then be generalized and extended to N dimensions, where it can be used to resolve up to N+1 simultaneous leakers.

Figure 6:
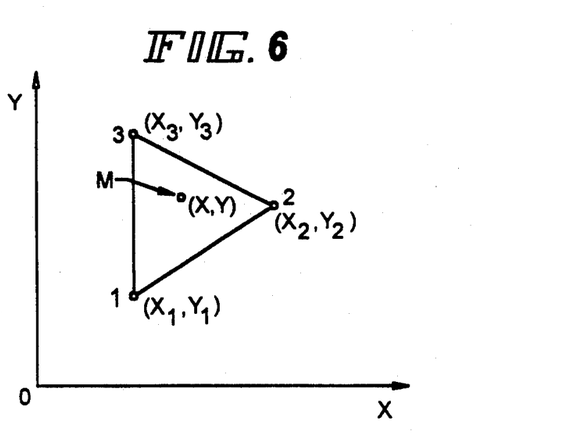
FIG. 6 shows a three node triangle used to establish the transformation from global (Cartesian) coordinates to a barycentric-coordinates system, where the value M denotes a measured node with global coordinates (x, y)

FIG. 6 shows a node triangle in which we desire to define a barycentric-coordinate system. The goal is to select three weighting functions—$c_1$, $c_2$ and $c_3$—to describe the coordinates of any point M that falls inside, outside or on the edge of the triangle.

We will let the original Cartesian coordinates of M be (x,y) and require that these coordinates be linearly related to the new coordinates by the following equations:

$$x = c_1 x_1 + c_2 x_2 + c_3 x_3,$$

$$y = c_1 y_1 + c_2 y_2 + c_3 y_3. \qquad \text{[Eq. 1]}$$

The coordinates $c_1$, $c_2$ and $c_3$ may be interpreted as weighting functions relating the coordinates of the three tag nodes to the coordinates of any point in the plane. The desirable property of the weighting function is that the value of $c_i$ should be unity at node i and zero at the other two nodes. This condition is imposed by requiring that the weighting functions sum to unity; that is, $$c_1 + c_2 + c_3 = 1. \qquad \text{[Eq. 2]}$$

From Eq. 2 it is clear that only two of the barycentric coordinates can be independent, just as in the original ratio system, where there are only two independent coordinates.

In matrix form, Eqs. 1 and 2 become $$\begin{pmatrix} x_1 & x_2 & x_3 \\ y_1 & y_2 & y_3 \\ 1 & 1 & 1 \end{pmatrix} C_3 = \begin{pmatrix} x \\ y \\ 1 \end{pmatrix}, \qquad \text{[Eq. 3]}$$

where $$C_3 = \begin{pmatrix} c_1 \\ c_2 \\ c_3 \end{pmatrix} \qquad \text{[Eq. 4]}$$

Eq. 3 exhibits at once both the power and the simplicity of the barycentric-coordinates technique. Because of the unique properties of the $C_3$ vector, one can perform the trivial inversion of Eq. 3 to determine $C_3$ and obtain all the information that can be extracted from a given mass spectrometer reading regarding which of the three suspect assemblies is leaking and which ones are not. Moreover, if more than one of the suspects is leaking, the $C_3$ vector will also provide the relative amounts of tag gas (and hence also fission gas) that have escaped from each leaking assembly.

Figure 7:
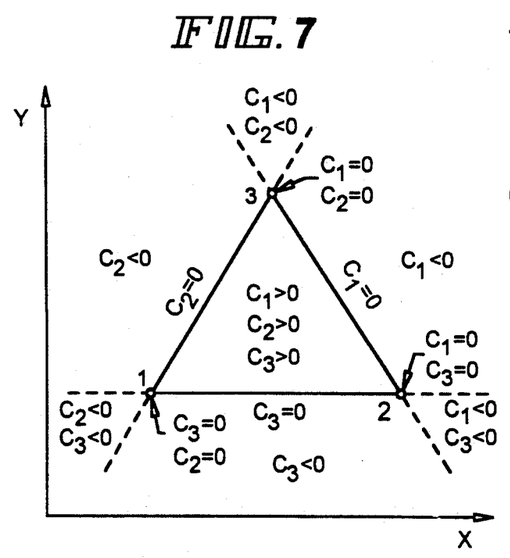
FIG. 7 is a graphic representation of the values taken on by components of the $C_3$ vector in various regions of the simplex plane.

The properties of the components of $C_3$ and the relation between the global-coordinate system (i.e., the Cartesian ratio plane) and the local, barycentric-coordinate system are illustrated graphically in FIG. 7 for a general triangular simplex.

As described above, the problem of determining which of three suspect assemblies is leaking and which are not is equivalent to determining where the measured tag node falls with respect to the triangle whose vertices are the three suspect nodes. This information can be obtained from the properties displayed in FIG. 7 by simply testing the values of the three components of $C_3$, thereby eliminating the computationally inefficient geometric techniques described earlier.

For example, in the simplest case, in which only one of the three suspect assemblies is leaking, the component of $C_3$ corresponding to that assembly will be 1, while the remaining two components will be zero. Thus, if it were determined that, say, $c_2 = 1$ with $c_1$ and $c_3$ both zero, it would be known that assembly 2 had a defective fuel rod and that it was the only assembly containing a leaker. Geometrically, this would mean that the measured tag node coincides with node 2 in FIG. 7.

Now suppose that one of the c's is computed to be zero, while the other two c's have values that lie between 0 and 1. In this case, the assemblies corresponding to the two non-zero components are both leaking tag gas, while the assembly corresponding to the zero component is not. Thus, if it were found that, say, $c_3=0$, while $0<c_1<1$ and $0<c_2<1$, it would be known that assemblies 1 and 2 both contained leakers, while assembly 3 could be eliminated as a suspect. Geometrically, this situation would arise if the measured tag node were to fall on the tie-line connecting nodes 1 and 2 in FIG. 7.

If all three assemblies are leaking simultaneously, then all three c's in Eq. 4 will have values that are non-zero and non-negative [i.e., by Eq. 2, this is equivalent to saying that all three c's will have values between 0 and 1]. In this case it also means that the measured tag node falls inside the triangle whose vertices are the three tag nodes.

Finally, if any component of $C_3$ is found to have a negative value, then at least one other assembly (other than, or possibly in addition to, the three assemblies currently being considered as suspect) is leaking. This case occurs when the measured tag node falls outside the triangle whose sides connect the three tag nodes.

Table I summarizes the various properties of the components of the $C_3$ vector that enables one to determine which of three given suspect assemblies is leaking and which are not. The table shows the physical interpretations and the corresponding geometric interpretations for the various possible outcomes of the $C_3$ calculation.

A simple numerical example explicates these ideas for an elementary two-dimensional problem. Consider three assemblies whose tag nodes are located at (1,0), (2,1) and (1,1). These three nodes are depicted in the X-Y tag plane in FIG. 8.

Figure 8:
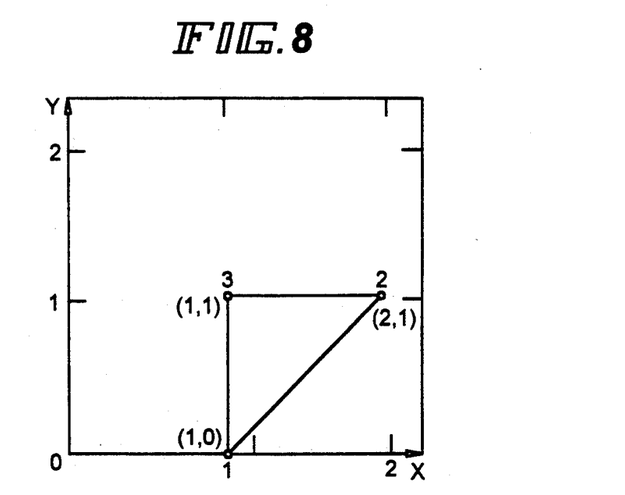
FIG. 8 is a graphic representation of the tag gas isotopic ratios for a system of three tags illustrating the properties of the $C_3$ vector.

Several possible positions of the measured tag node have been chosen to illustrate each of the observed properties associated with the $C_3$ vector. The coordinates of the measured node, the solution vector $C_3$ and an interpretation of each are given in Table II.

TABLE II

Outcome of $C_3$ Calculation for Measured Node Coordinates Selected at Various Positions in Ratio Plane of FIG. 8

| Coordinates of Measured Node | $C_3$ | Interpretation |
|---|---|---|
| (2, 1) | 0<br>1<br>0 | Measured node coincides with node 2. Assembly 2 leaking. |
| (1.5, 1) | 0<br>0.5<br>0.5 | Measured node falls on line 23. Assemblies 2 and 3 leaking. |
| (1.25, 0.5) | 0.5 | Measured node falls inside |

TABLE II-continued

Outcome of $C_3$ Calculation for Measured Node Coordinates Selected at Various Positions in Ratio Plane of FIG. 8

| Coordinates of Measured Node | $C_3$ | Interpretation |
|---|---|---|
| | 0.25<br>0.25 | triangle. All three assemblies leaking. |
| (1.5, 2) | −1<br>0.5<br>1.5 | Measured node falls outside triangle. Must be other assemblies leaking. |

TABLE I

Geometric and Physical Properties of $C_3$ Solution Vector

| Outcome of $C_3$ Determination | Physical Interpretation | Geometric Interpretation |
|---|---|---|
| $c_i = 1$<br>$c_j = 0$<br>$c_k = 0$ | Assembly i leaking | Measured node coincides with tag node i |
| $c_i = 0$<br>and $0 < c_j < 1$<br>and $0 < c_k < 1$ | Assemblies j and k leaking simultaneously | Measured node falls on line connecting nodes j and k |
| $0 < c_i < 1$<br>and $0 < c_j < 1$<br>and $0 < c_k < 1$ | Assemblies i, j and k leaking simultaneously | Measured node confined to triangle whose sides connect nodes i, j and k |
| $c_i < 0$<br>or $c_j < 0$<br>or $c_k < 0$ | Assemblies i, and/or j and/or k could be leaking, but at least one other assembly must be leaking elsewhere in the system | Measured node lies outside triangle whose sides connect nodes i, j and k |

The BCT approach thus far described was developed on a large main frame computer and applied to a relatively small system of tags such as in the case of EBR-II, with less than 80 unique tags. This BCT approach is not suitable for LWR tagging applications which can require more than 750 unique tags. As the number of unique tags in the reactor increases, the number of tag combinations to be searched with the BCT approach increases supraexponentially. For example, for a system of 200 unique tags in a 4-dimensional tagging system, the number of node combinations taken five at a time is 2.53E10. Although calculational burdens such as this can be readily accommodated on supercomputers to which a national laboratory may have access, it is not feasible for a public utility to purchase a multi-million dollar computing machine to perform these tagging calculations.

In order to overcome this problem known as combinatorial explosion, the present invention exploits systematic heuristic rules that are applied in a transformed node space, substantially reducing the number of node combinations which must be processed with the BCT algorithm. Although the present invention described in detail below works equally well in three- and four-dimensional systems, it is described herein in the context of a two-dimensional tag space for ease of illustration. All of the geometric concepts described herein have direct analogies in the higher dimensional systems.

Figure 9A:
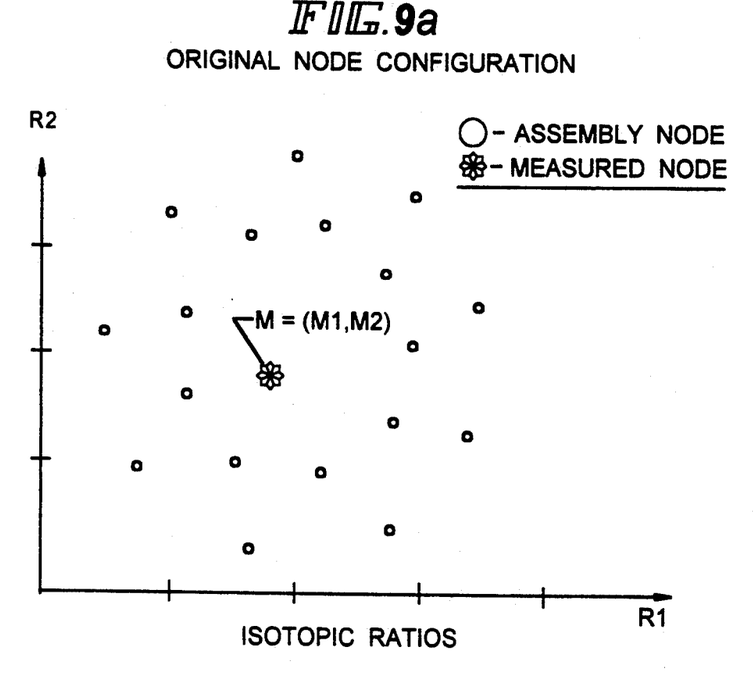
FIG. 9a and 9b are graphic representations respectively of an original node configuration for isotopic ratios in a gas tagging arrangement and an isotopic ratio node configuration translated so that the measured node M is at the origin of the new coordinate system in carrying out the present invention.
Figure 9B:
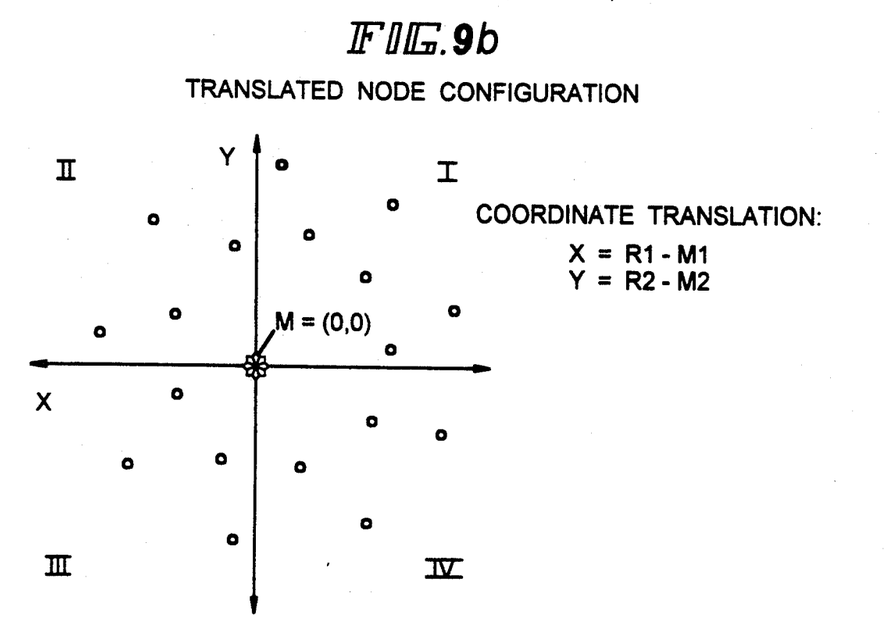

The first step in carrying out the expert method for identification of simultaneous and sequential reactor fuel failures with gas tagging is to perform a coordinate translation so that the measured tag node M is at the origin of the new coordinate system. An example of a two-dimensional node system before and after this coordinate translation is shown graphically in FIGS. 9a and 9b. As described above in terms of the prior art BCT approach, the problem of identifying feasible leaker combinations in a two-dimensional system is geometrically equivalent to identifying all triangles whose vertices are tag nodes and which enclose the measured node. In the translated coordinate system shown in FIG. 9b, it can readily be seen that any node triangles lying entirely in Region I cannot enclose the measured node at the origin of the coordinate system. Likewise, for Regions II, III and IV, any node triangles lying entirely in any one of these regions cannot enclose the measured node at the origin. Similarly, triangles lying entirely in the upper half-plane, i.e., Regions I and II, cannot enclose the node at the origin. This also applies for triangles lying in Regions II-III, III-IV and IV-I. Our first set of heuristic rules then is to eliminate from consideration all node triangles that fall into these 8 categories. In practice, these rules are implemented by simple conditional checks on the signs of the node coordinates in the translated coordinate system.

The second set of heuristic rules for leaker searches is based upon plant personnel having knowledge of previous leaker identities. In principle, the expert system and method of the present invention does not require knowledge of the composition of tags from prior leakers. However, if the identities of recent previous leakers are known, then it is likely that small amounts of residual tag isotopes remain in the coolant system from those leakers. By inputting the identities of the most recent one or two leakers, the present invention treats those tag nodes as "background" gases and tests only the triangles containing one (or both) of the background nodes. If, in fact, no gas remains in the system from those previous leakers, this will be immediately evident by the earliest calculations in carrying out the present invention which would show a C component of near zero for the background nodes. Where the C component for the background nodes is near zero, the method of the present invention resumes its search of all triangles remaining after the first set of coordinate translation heuristics. But in the more likely cases where residual gas is still present from previous leakers, the search space is reduced to an extremely small fraction of the original very large number of trial node combinations.

The final step in carrying out the expert system and method of the present invention involves the application of fuzzy logic. Although tagging coordinate schemes are designed on the basis of points and lines, these ideal abstractions do not exist in the real world of experimental systems. Because of small imperfections in the blending procedure used to create the tags, and experimental uncertainties in the mass spectrometer used to quantify the tag compositions, "points" in tag space are in reality fuzzy spheres and "tie-lines" are actually fuzzy cylinders. Thus, rather than being characterized by exact equalities and unambiguous inequality relationships, the tag gas analytical system is well suited for fuzzy set theory formalism. This fuzzy logic set theory formalism is embodied in a conditional branching hierarchy to determine the most likely volumes of tag gases emanating from each of the failed rods in a multiple leaker situation.

Figure 10A:
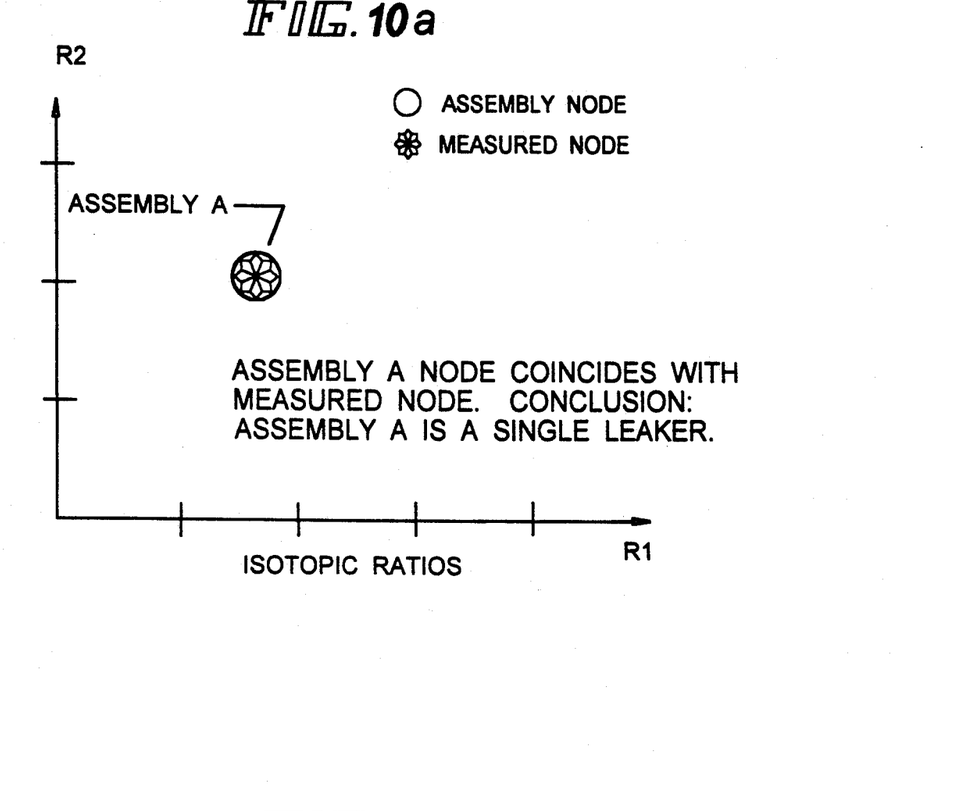
FIGS. 10a and 10b respectively illustrate graphically a two-dimensional system having a single assembly leaker as analyzed by a prior art approach and as analyzed by the expert system and method of the present invention which takes into consideration experimental uncertainties.
Figure 10B:
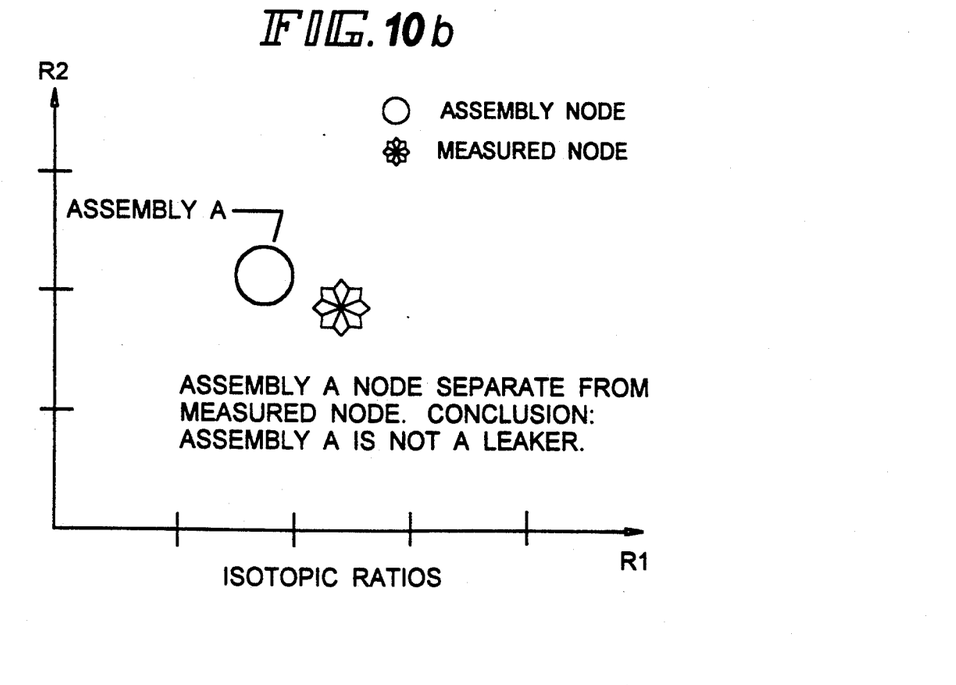

To illustrate the limitations of prior art leaking fuel rod analysis arising from experimental uncertainties, reference is made to FIG. 10a which shows a two-dimensional system with a single assembly leaker. Ideally, if there were no experimental uncertainties in the system, the measured tag node would coincide exactly with the tag node for Assembly A in a single leaker situation as shown in FIG. 10a. In practice, however, experimental uncertainties can result in the measured node lying some distance from the assembly node as shown in FIG. 10b. This situation may result in a misidentification of the leaker because in prior art approaches there was no reliable quantitative way to conclude that Assembly A is a leaker.

Figure 11A:
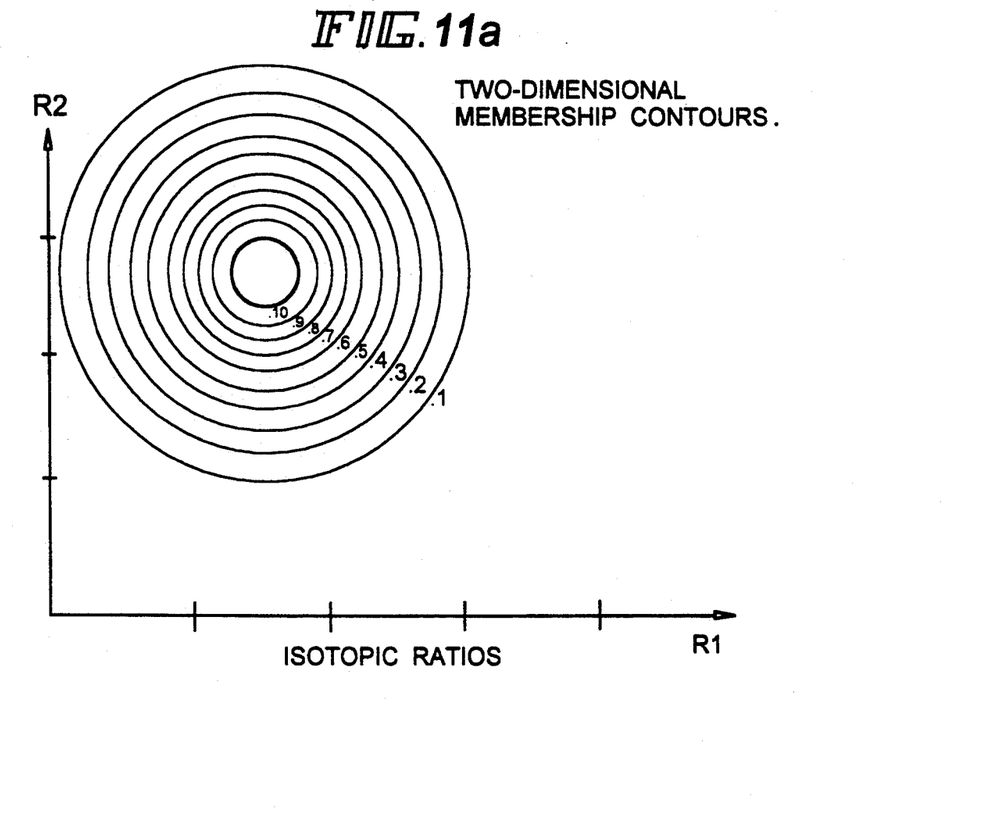
FIG. 11a and 11b illustrate the application of fuzzy logic to a two-dimensional gas tagging case involving a single leaker by means of two-dimensional radial membership contours and the overlapping of membership contours in accordance with the present invention.

In the present invention, this difficulty is overcome with a multi-dimensional adaptation of fuzzy logic formalism. FIG. 11a graphically illustrates the fuzzy logic approach employed in carrying out the present invention for the simplest case of a two-dimensional system involving a single leaker by representing a two-dimensional radial membership contour. This two-dimensional function is defined so that it has a value of 1.0 at the exact coordinates of a given tag node, whether an assembly node or a measured node, and the membership function decays radially to a value of 0.0 at some "distance" from the node. The radius at which the membership function assumes a value of zero is specified by the gas chemists for any given tagging system and is influenced by the isotopes used as well as the experimental resolution of the mass spectrometer used for detecting those isotopes.

Figure 11B:
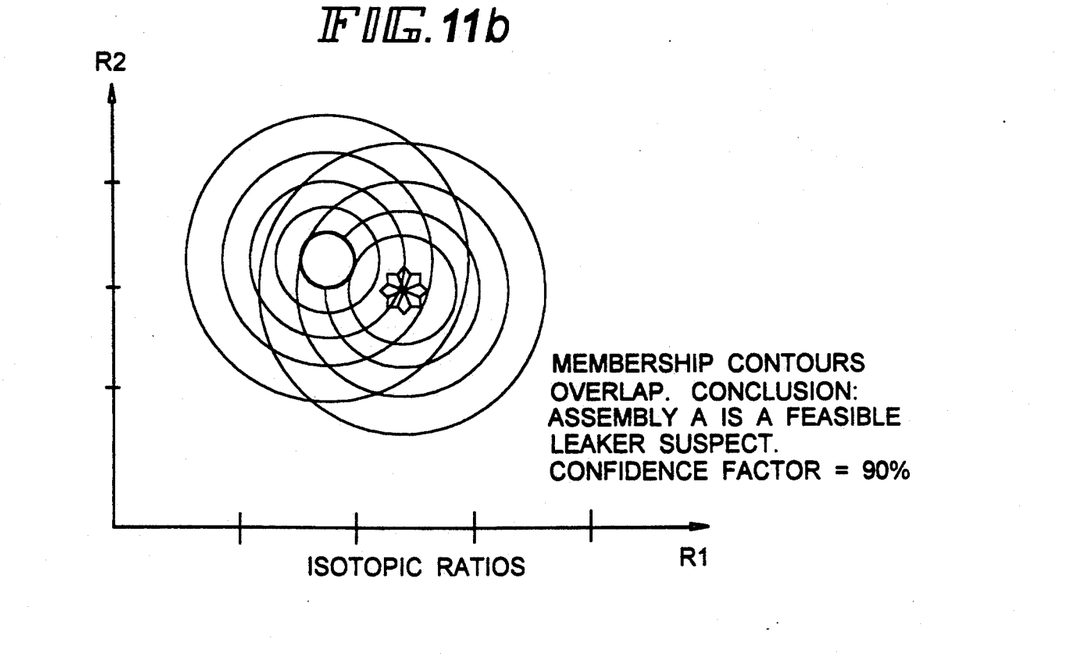

With reference to FIG. 11b, there is graphically shown the overlapping of membership contours when the measured node lies a small distance from an assembly node. The values of the membership contours are combined using a multi-dimensional extension of fuzzy set theory to provide a quantitative confidence factor for any given leaker identification. This feature of the present invention is vital for commercial reactor deployment of gas tagging systems, where a misidentification of a leaker (or leakers) could result in plant down time costing on the order of $1,000,000 per day.

For a two leaker situation, in a two-dimensional system the membership functions are elliptical and surround the line segment connecting the pair of assembly nodes under consideration. These elliptical functions decay systematically from a value of 1.0 on the line, to a value of 0.0 some distance from the line. In a three-dimensional tagging system, for a three leaker situation the three assembly nodes considered as suspects form a triangle. In this case, the three dimension membership functions are defined as closed surface contours that envelope the triangle and decay systematically from 1.0 in the plane of the triangle to a value of 0.0 some distance from the plane of the triangle. Similarly, for four leaker combinations, the membership contour functions are in the form of a three-dimensional tetrahedron. In all cases, the three-dimensional membership contours are combined systematically with the spherical membership contours associated with the measured node to provide a ranking of the most likely leaker combinations, with each combination having its associated quantitative confidence factor.

There has thus been shown an expert system and method for the identification of simultaneous and sequential nuclear reactor fuel failures by means of gas tagging. In the inventive system and method, failures are catalogued and characterized after the event so that samples of the reactor's cover gas are taken at regular intervals and analyzed by mass spectroscopy. Employing a first set of systematic heuristic rules which are applied in a transformed node space allows the number of node combinations which must be processed within a barycentric algorithm to be substantially reduced. The node space is transformed by performing a coordinate translation so that a measured tag node M is at the origin of the new coordinate system. Node triangles are then generated by identifying feasible leaker combinations in two dimensions in a two leaker system. The first set of heuristic rules further includes eliminating all node triangles which are entirely within Regions I-IV or are within Regions I-II . . . IV-I or which do not encompass the measured tag node M at the origin. A second set of heuristic rules treats the tag nodes of the most recent one or two leakers as "background" gases, further reducing the number of trial node combinations. This involves selecting only those triangles containing previously leaked gases. Lastly, a fuzzy set theory formalism minimizes experimental uncertainties in the identification of the most likely volumes of tag gases. This fuzzy logic approach in the two-dimensional case employs a two-dimensional function defined so that it has a value of 1.0 at the exact coordinates of the given tag node, with the membership function decaying radially to a value of 0.0 at some "distance" from the node. The radius at which the membership function assumes a value of zero is specified by the gas chemists for any given tagging system and is influenced by the isotopes used and the experimental resolution of a mass spectrometer for those isotopes. The values of the membership contours are combined using a multi-dimensional extension of fuzzy set theory to provide a quantitative confidence factor for any given leaker identification. The two-dimensional tag space for a two leaker system has direct analogy to higher dimensional systems involving more than two leakers. The expert system and method of the present invention allows for the identification of virtually any number of sequential leaks among as many as 800 unique gas tag samples and up to five simultaneous gas leaks from fuel elements.

While particular embodiments of the present invention have been shown and described, it will be obvious to those skilled in the art that changes and modifications may be made without departing from the invention in its broader aspects. Thus, while the present invention has been described for use with an inert cover gas such as in a liquid metal cooled reactor, the present invention is equally applicable where a cover gas is not employed such as in a commercial water cooled reactor. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. In a nuclear reactor having a plurality of fuel elements each including an inner fuel rod and an outer cladding disposed about and enclosing said fuel rod in a sealed manner, wherein each fuel element further includes a unique tag gas to assist in detection of a leak from a failed fuel element, a method for identifying a fuel element failure comprising the steps of:

determining the composition in terms of one or more tag gases of a leaked gas from one or more of the fuel elements and assigning the composition of the leaked gas a tag node M in a first coordinate system;

translating said tag node M to a second coordinate system wherein said tag node M is at the origin of said second coordinate system;

generating a plurality of geometric node figures by identifying possible combinations of tag gases, wherein each corner of each of said geometric node figures represents a tag gas from a possible leaking fuel element and wherein the area or volume within all of said geometric figures represents all possible combinations of tag gases from leaking fuel elements;

selecting only those tag gases within node figures encompassing the origin of said second coordinate system as from possibly leaking fuel elements;

comparing the node encompassing the origin of said second coordinate system with a predetermined number of most recently leaking fuel element tag gases;

selecting only those node figures containing said most recently leaking fuel element tag gases;

defining the selected node figures in terms of a membership contour ranging from 0 to 1, wherein 0 represents 0 probability of a gas tag and 1 represents 100% probability of a gas tag; and comparing the membership contours of each of the selected node figures with said tag node M for identifying a failed fuel element while compensating for measurement and tag gas composition uncertainties.

2. The method of claim 1 wherein the compositions of two tag gases are determined and wherein each of said geometric node figures is a straight line.

3. The method of claim 1 wherein the compositions of three tag gases are determined and wherein each of said geometric node figures is a triangle.

4. The method of claim 1 wherein the compositions of four tag gases are determined and wherein each of said geometric node figures is a tetrahedron.

5. The method of claim 1 wherein said predetermined number of the most recently leaking fuel elements is two or three.

6. The method of claim 1 wherein said membership contour is defined in terms of a dimension R, where R is 1 at the coordinates of a given tag node and R is 0 at zero probability of a gas tag.

7. The method of claim 1 further comprising the step of repeating the step of generating a plurality of geometric node figures by identifying possible combinations of tag gases if no node figure contains a most recently leaking fuel element tag gas.

* * * * *